United States Patent [19]

Dubost

[11] 4,329,018
[45] May 11, 1982

[54] OPTICAL TELECOMMUNICATIONS CABLE

[75] Inventor: René Dubost, La Tour du Pin, France

[73] Assignee: Societe Anonyme dite: Les Cables de Lyon, Clichy, France

[21] Appl. No.: 860,974

[22] Filed: Dec. 15, 1977

[30] Foreign Application Priority Data

Dec. 21, 1976 [FR] France .................. 76 38457

[51] Int. Cl.³ ............................................. G02B 5/14
[52] U.S. Cl. .................................. 350/96.23; 350/320
[58] Field of Search ............... 350/96.23, 320, 96.20, 350/96.21, 96.22; 174/117 F

[56] References Cited

U.S. PATENT DOCUMENTS

| | | | |
|---|---|---|---|
| 3,766,307 | 10/1973 | Andrews, Jr. | 350/96.23 X |
| 3,798,099 | 3/1974 | Marcatili | 350/96.23 X |
| 3,864,018 | 2/1975 | Miller | 350/96.21 |
| 3,984,172 | 10/1975 | Miller | 350/96.21 |
| 4,028,081 | 6/1977 | Marcatili | 350/96.23 X |
| 4,078,853 | 3/1978 | Kempf et al. | 350/96.23 |
| 4,097,324 | 6/1978 | Emmel | 174/117 F X |

FOREIGN PATENT DOCUMENTS

| | | | |
|---|---|---|---|
| 2530242 | 2/1976 | Fed. Rep. of Germany | 350/96.23 |
| 2294460 | 7/1976 | France | 350/96.23 |
| 106716 | 6/1974 | German Democratic Rep. | 350/96.23 |

*Primary Examiner*—John D. Lee
*Attorney, Agent, or Firm*—Sughrue, Rothwell, Mion, Zinn, Macpeak and Seas

[57] ABSTRACT

An optical telecommunications cable comprising an outer tube of circular cross-section made of aluminum covered with a plastics material and a plurality of strands of circular cross-section inside the outer tube, the strands being assembled tangentially to one another and each of the strands being constituted by an elementary circular structure covered by a tubular covering made of plastic material and reinforced by three strength members disposed at 120° in the covering. The elementary circular structure comprises a substantially rectangular matrix structure, surrounded by compressible filler tapes made circular by being bound in a paper or plastic binding tape wound helically thereabout, the matrix structure being constituted by a plurality of tape components with ridges and troughs stacked and fastened to each other and including hexagonal cells containing respective optical conductors, each of the tape components being composed of two thin aluminum tapes with troughs, whose opposite surfaces are coated with polyethylene and are welded longitudinally by heat softening of the polyethylene.

7 Claims, 10 Drawing Figures

OPTICAL TELECOMMUNICATIONS CABLE

FIELD OF THE INVENTION

The present invention relates to an optical fibre transmission cable, comprising a number of optical conductors which can be used separately for transmitting telephone signals or transmitting data; it also relates to a method of manufacturing such a cable.

PRIOR ART

The forming of small diameter optical conductors comprising a core and silica cladding of different refractive indices is known.

Because of the low performance of their mechanical characteristics, such as, elongation, breaking strength, and bending, these optical conductors cannot be employed without special preparation if conventional cable making machines are used. This preparation consists, in the majority of cases, in one or several covering operations necessary for improving the aforementioned mechanical characteristics.

An optical telecommunications cable or the like must meet various requirements relating to:

the attenuation of the optical conductors, which must not increase or must increase only slightly during the production of the cable itself;

its tensile strength which must withstand pulling through cable ducts with an elongation such that there is no breakage of the optical conductors; and its resistance to all the other mechanical handling stresses which produce bends, curves, pressure and vibrations.

All the above-mentioned characteristics of the cable must remain stable over time, within tolerable limits fixed in advance, even in the case of thermal and hygroscopic stresses associated with the variable climatic states.

It is known that the construction of such cables makes use of very elaborate techniques and products. Up to now, the constraints of practical use have required an improvement of the mechanical characteristics and a protection at the unit level of the fibre before use on equipment very similar to conventional cable making equipment. Such a process leads to a unit treatment of the optical conductors before cable making. Also, for economical reasons, a structure which is more simple and more rapid to use is constantly being sought.

By way of an example, one technique consists in a tight covering of an optical conductor with a plastic material, to avoid microdeviations as much as possible, which are the cause of an increase in attenuation; these covered conductors are cabled between two shock-absorbing buffers made of cellular material. Another similar technique consists in a double covering, the first covering being clamped on the optical conductor while the second is slack, thus avoiding the effect of the transverse stresses; this second technique has the advantage of forming a compact cable, since the tubes of the second covering are bound by tapes on a central carrier. Such structures have the disadvantage of being very bulky if it is required to provide effective protection. Lastly, such structures require, at the time when two cables are spliced, the separate baring of each fibre, this making the splicing of the cables long and expensive.

An elementary transmission cable is already known which is formed by a tape of cylindrical optical conductors connected together by low melting point triangular glass fibres. This set of optical conductors is capable of being connected in bulk to an identical assembly, taking into account the relative precision obtained. One disadvantage of this technique is the delicate handling it requires as well as the high probability of breakages at the time of cabling (BELL SYSTEM TECHNICAL JOURNAL—Vol. 54—No. 3—March, 1975). Another disadvantage resides in the fact that the differential thermal expansions of silica and of the plastic coverings are generators of high additional losses during temperature changes.

SUMMARY OF THE INVENTION

The advantage of the present invention is that it puts the fibre in its protective covering at a temperature which is low in relation to the drawing method and further, the coefficient of linear expansion of aluminum is low in comparison with the coefficient of expansion of a plastic material. The phenomena of relative expansion generating increases in attenuation are thus prevented.

The present invention provides, in a first aspect, a method of manufacturing a matrix structure for an optical telecommunications cable, comprising a first step in which longitudinal troughs with a trapezoidal cross-section are pressed in a ductile metal tape which is covered on one of its surfaces with a layer of thermoplastic and thermo-weldable material; a second step in which two of said tapes are thermo-welded against each other so as to form a tape component in which facing pairs of said trapezoidal troughs constitute hexagonal tubes in which respective optical conductors are inserted; and a third step in which a plurality of said fibre-containing tape components are stacked so as to form a matrix structure with a substantially rectangular cross-section.

In a second aspect the present invention further provides a method of manufacturing a strand for an optical telecommunications cable from the said matrix structure; the method comprising a fourth step in which a longitudinal filler tape of compressible material is adjoined on each long face of said matrix structure; a fifth step in which a helical binding tape is wound around said longitudinal filler tapes to compress them so that said tape-coated matrix structure becomes a structure of circular section, hereinafter referred to as an elementary circular structure; a sixth step in which the elementary circular structure is twisted by winding it on a winder whose drum besides rotating about its own axis also turns on an axis parallel to the axis of the elementary circular structure in its production line; and a seventh step in which said elementary circular structure is coated with a covering of plastic material reinforced by strength members so as to constitute a cable strand.

In a third aspect, the present invention further provides a method of manufacturing an optical telecommunications cable from a plurality of the said strands; the method comprising an eighth step in which a plurality of strands are assembled tangentially to one another and an aluminum tube is drawn and swaged on said assembly of strands; and a ninth step in which the aluminum tube is coated with a plastic material.

The present invention also provides an optical telecommunications cable comprising: an outer tube of circular cross-section made of aluminum covered with a plastic material; a plurality of strands of circular cross-section inside said outer tube, the strands being assembled tangentially to one another; and each of the strands being constituted by an elementary circular structure covered by a tubular covering made of plastic material and reinforced by three carriers disposed at 120° in said covering, said elementary structure comprising a substantially rectangular matrix structure, surrounded with compressible filler tapes made circular by being bound in a paper or plastic binding tape wound helically thereabout, said matrix structure being constituted by a plurality of tape components with ridges and troughs stacked and fastened to each other and including hexagonal cells containing respective optical conductors, each of the tape components being composed of two thin aluminum tapes with troughs, whose opposite surfaces are coated with polyethylene and welded longitudinally by heat softening of said polyethylene.

BRIEF DESCRIPTION OF THE VIEWS OF THE DRAWINGS

Embodiments of the invention are described by way of example with reference to the accompanying drawings, in which.

DETAILED DESCRIPTION

Figure 1:
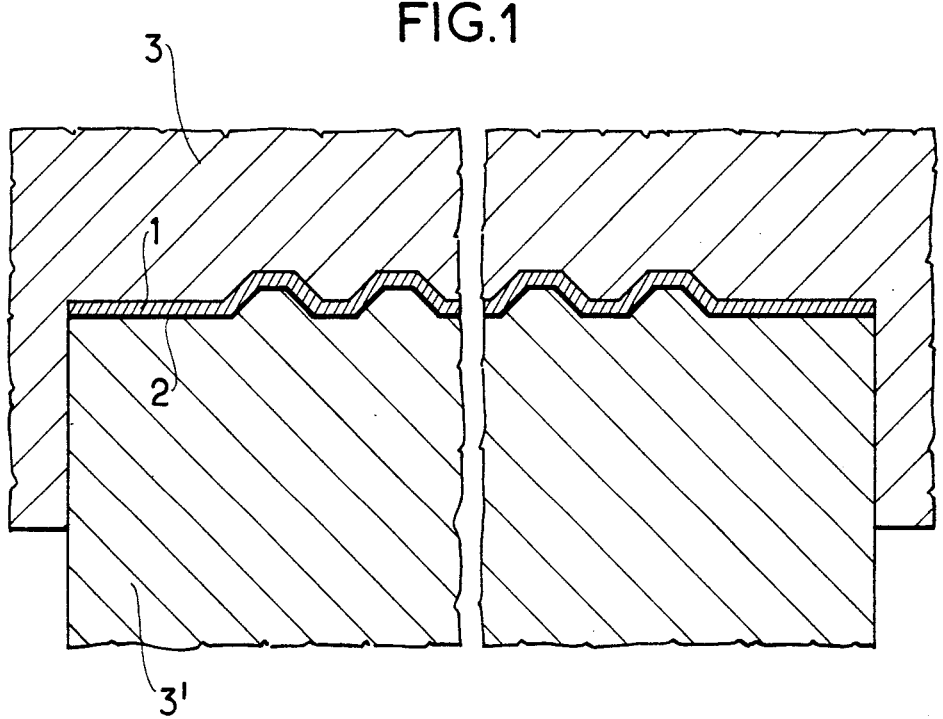
FIG. 1 is a cross-section of the aluminum tape covered on one face with polyethylene grafted or treated in such a way that its adherence to the aluminum will be satisfactory at the time of its formation.

FIG. 1 shows the complementary profiles of rollers (3 and 3') forming an aluminum tape (1) which is covered on one face with polyethylene (2) which is grafted or otherwise treated in such a way that its adherence to the aluminum will be satisfactory. The profile of the rollers is such as to cut the tape (1) longitudinally and form the tape (1) without excessive deformation of the thickness of the grafted polyethylene covering (2). One of the rollers of the forming pair (3 and 3') is adjustable for this purpose in the direction of the three axes (X, Y, Z).

Figure 2:
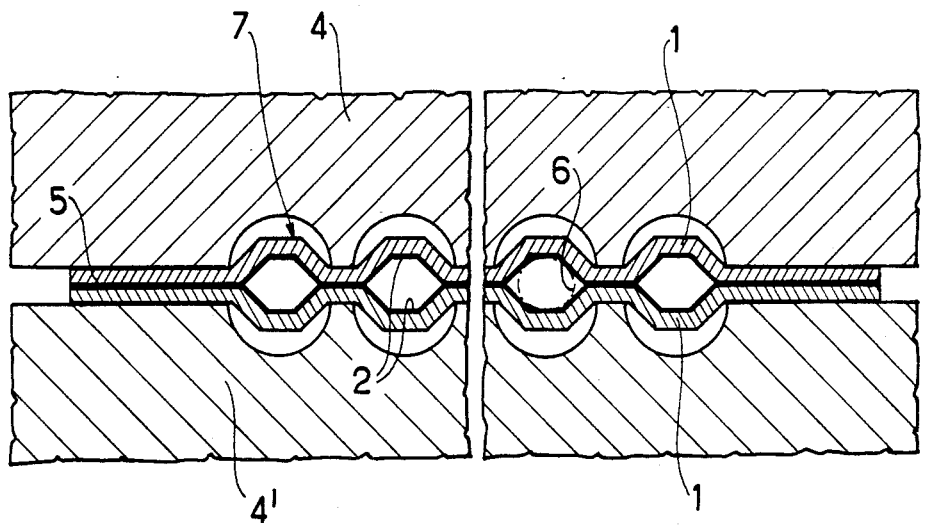
FIG. 2 is a cross-section of the tape component at the time when it is welded.

FIG. 2 shows the formation of a tape structure made from two tapes (1) formed by the method described above. A pair of welding rollers (4 and 4') is heated to a temperature of the order of 100° C. At this temperature, the layers (2) of grafted polyethylene of the lower and upper tapes are welded by simple contact and application of pressure. The welding rollers are heated on a zone before the weld point (5). The energy necessary for the heat softening of the grafted or treated polyethylene is transmitted through the aluminum tapes. Melting of the grafted polyethylene in the troughs of the tape component is thus avoided by suitable shaping of the welding rollers (4 and 4'). Since the ridges of the welding rollers are higher than the troughs of the aluminium tape are deep, energy is supplied only at the zone to be welded. Further, these higher ridges in the welding rollers allow proper guidance of the tapes (1) on the rollers (4 and 4'). One of the rollers of the pair of welding rollers is adjustable along the X, Y and Z axes so as to make the zones to be welded coincide exactly. An assembly of n hexagonally shaped tubes whose inside is lined with grafted polyethylene is therefore formed. This tube is characterized by its minimum envelope diameter (6) which is the diameter of a theoretical circle which is tangential to the sides of the polygon.

Figure 3:
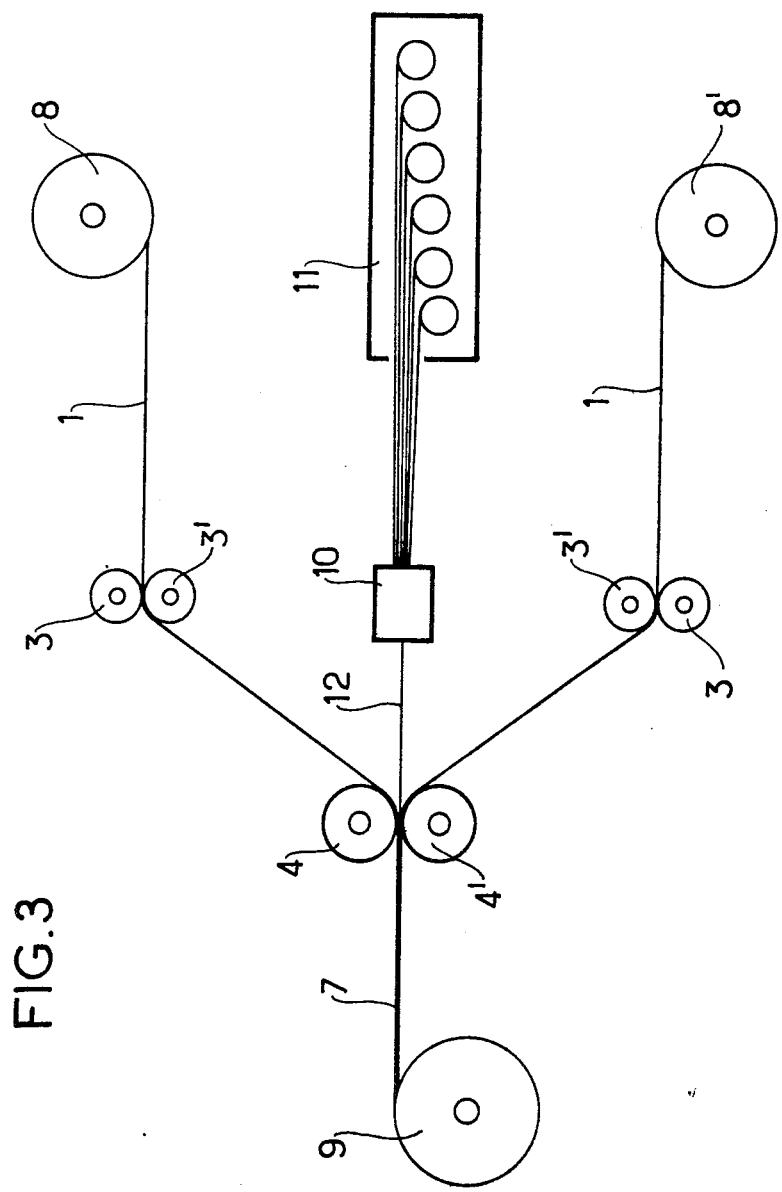
FIG. 3 is a synoptic diagram of a production line for a tape component.

In accordance with the invention, a device (FIG. 3) for using the manufacturing method described in the previous paragraph relating to the tape component (7) comprises at least two systems (8 and 8') for unwinding aluminum tapes at a constant tension, two pairs of forming rollers (3 and 3'), a pair of welding rollers (4 and 4'), a device (9) for winding the tape component at a constant tension, a system (10) facing the input of the welding rollers for positioning fibres, and a bobbin (11) for unwinding optical conductors (12) at a constant tension. The mechanized welding rollers 4 and 4' impose the speed of the tape component production line; the speed of the two pairs of forming rollers 3 and 3' is dependent on the speed of the pair of welding rollers. The tape component, at this stage of production, can be wound in coils, since the optical conductors are situated at the neutral axis of the assembly thus formed and do not undergo any further stress.

By way of a non-limiting example, a tape component can have the following dimensions:

| | |
|---|---|
| thickness of the aluminum tape | 100 μm |
| thickness of the layer of grafted polyethylene | 20 μm |
| distance between two optical conductors of the same tape component | 0.8 mm |
| total width of the tape component for six optical conductors | 7 mm |
| total thickness of the tape component for a casing diameter of 300 μm | 750 μm |

Figure 4:
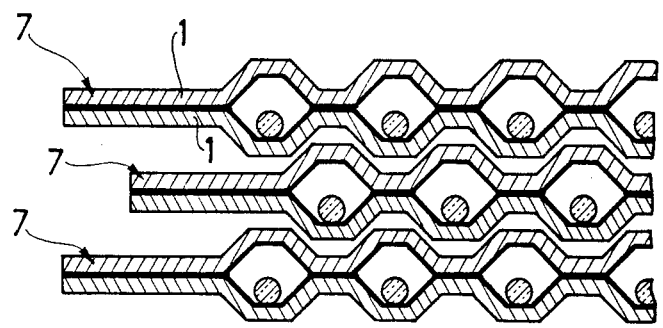
FIG. 4 is a cross-section of a matrix structure assembled in accordance with a "trough between two ridges" technique.
Figure 5:
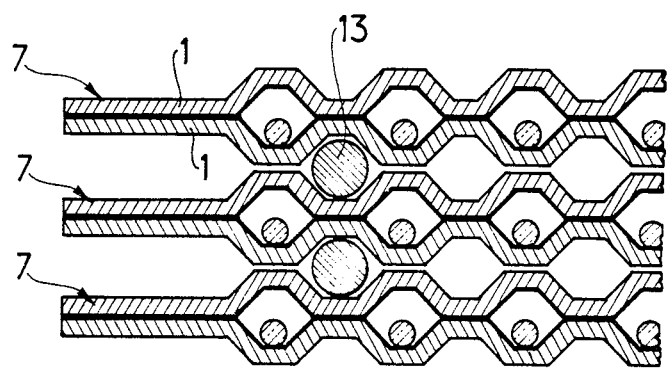
FIG. 5 is a cross-section of a matrix structure assembled in accordance with a "ridge on ridge" technique.

The tape components (7) are assembled in a matrix structure by successive stacking in accordance with one of the techniques described previously. FIG. 4 shows a matrix structure with a "trough between two ridges" stacking. FIG. 5 shows a matrix structure with a "ridge on ridge" stacking. In the first case, the tape components can be connected together by glueing of all or a part of the tape components. In the second case, the tape components can be connected together by means of a wire covered in an adhesive material and acting as a lateral guide. This wire (13) can also act as a strength member for the matrix structure, improving its elongation characteristics.

Figure 6:
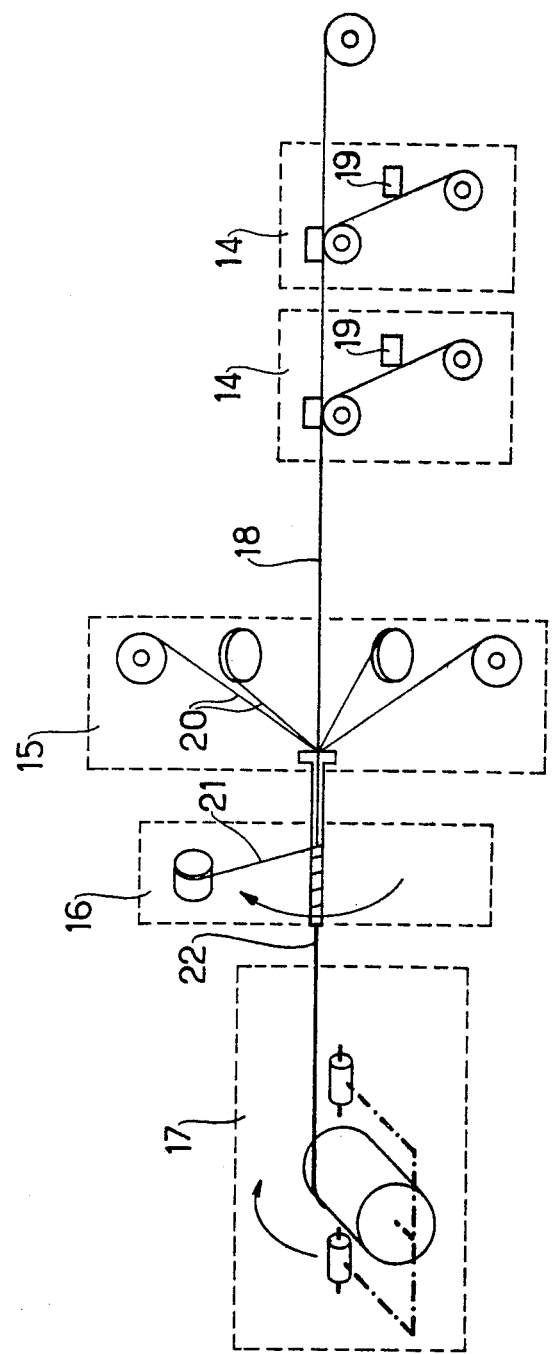
FIG. 6 is a synoptic diagram of a production line of the circular structure.

In accordance with the invention, a device (FIG. 6) for performing the production method relating to the elementary circular structure comprises at least two assembly heads (14), an assembly (15) for assembling the longitudinal tapes, a tape winding head (16), and a rotating pick-up device (17).

Figure 7:
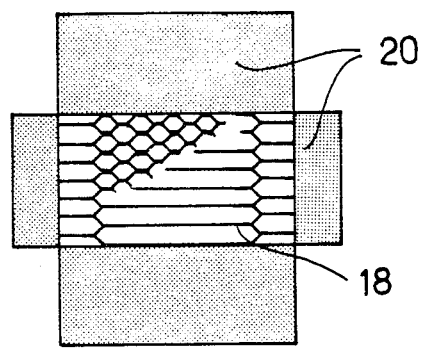
FIG. 7 is a cross-section of a matrix structure with four tapes made of cellular material.
Figure 8:
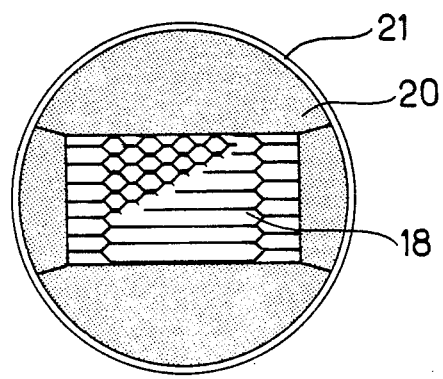
FIG. 8 is a cross-section of an elementary circular structure.

The matrix structure (18) is obtained by stacking n' tape components by means of n'−1) assembly heads, a coating system allowing the fixing of the tape component on the preceding tape component(s). In order to impart to this matrix structure a quasi circular form, a very thick filler tape (20) made of compressible material is joined to each face of the aforementioned structure; helical winding head (16) perfects the form of the structure thus produced by binding it with a paper or plastic binding tape (21). FIG. 7 shows the matrix structure with the compressible filler tapes added. FIG. 8 shows the matrix structure with addition of the compressible filler tapes after helical binding, called the elementary circular structure (22).

At this stage of production, it is not possible to wind the product thus formed on a drum since the elementary circular structure (22) containing the matrix structure (18), once it is wound, causes asymmetry of the optical conductors. Indeed, the outside optical conductors would be constantly stretched, the inside optical conductors would constantly be compressed, and only the optical conductors of the central component would be free from stresses due to the curvature of the elementary circular structure (22).

To avoid this phenomenon, the elementary circular structure (22) can be twisted, in which case the optical conductors are stretched in parts and compressed in other parts during winding of the elementary circular structure, according to whether they are twisted above or below the neutral axis. Since the optical conductors are free in the hexagonal tube, the tensions are balanced out by the optical conductors sliding in the hexagonal tubes.

The twist pitch $P_t$ of the elementary circular structure is defined as a function of the sliding capabilities of the optical conductors in the hexagonal tubes which contain them.

One disadvantage of this twisting is that it causes asymmetry between the optical conductors near the center of the matrix structure and the furthest optical conductors. Taking a cable whose matrix structure consists of an n' tape components containing n optical conductors, the optical conductors can be referenced by a pair of numbers (a, b), a indicating the position of the optical conductor in the tape, b indicating the position of the tape in the matrix structure. The optical conductors (o, o), (n, o), (o, n') and (n, n') have, after twisting, a pitch $P_t$ and a radius equal to a half diagonal of a cross-section of the matrix structure. These optical conductors therefore have a length $P_t + S$ over the pitch interval $P_t$. The central optical conductor (n/2, n'/2) has a length $P_t$ over the pitch interval $P_t$. This difference in length from that of the optical conductors furthest from the center is very small and can be compensated by tensioning the conductors slightly differently during assembly.

Such a structure allows easy referencing of the optical conductors by simple marking of a first tape component giving the reference for the origin of the counting.

The twisting of the elementary matrix structure is obtained by winder (17) whose drum, besides its own rotation, turns on an axis parallel to the axis of the product in its production line.

Figure 9:
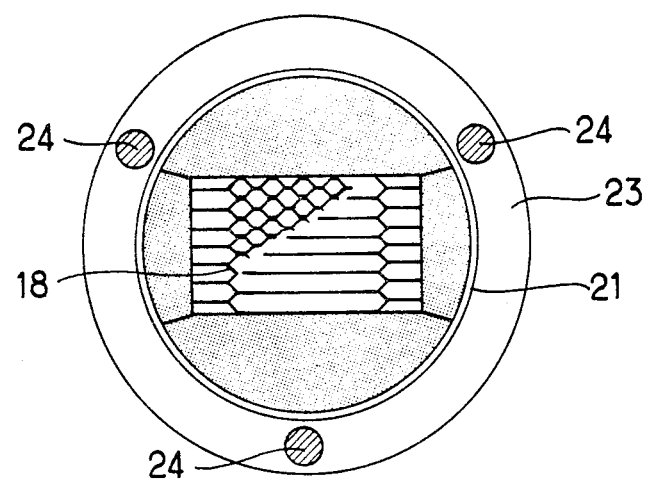
FIG. 9 is a cross-section of a strand.

FIG. 9 shows a strand obtained from an elementary circular structure reinforced by a covering (23) of plastic material. This structure comprises, as reinforcement, three strength members (24) disposed at 120° and designed to reinforce the strand against longitudinal stresses.

Figure 10:
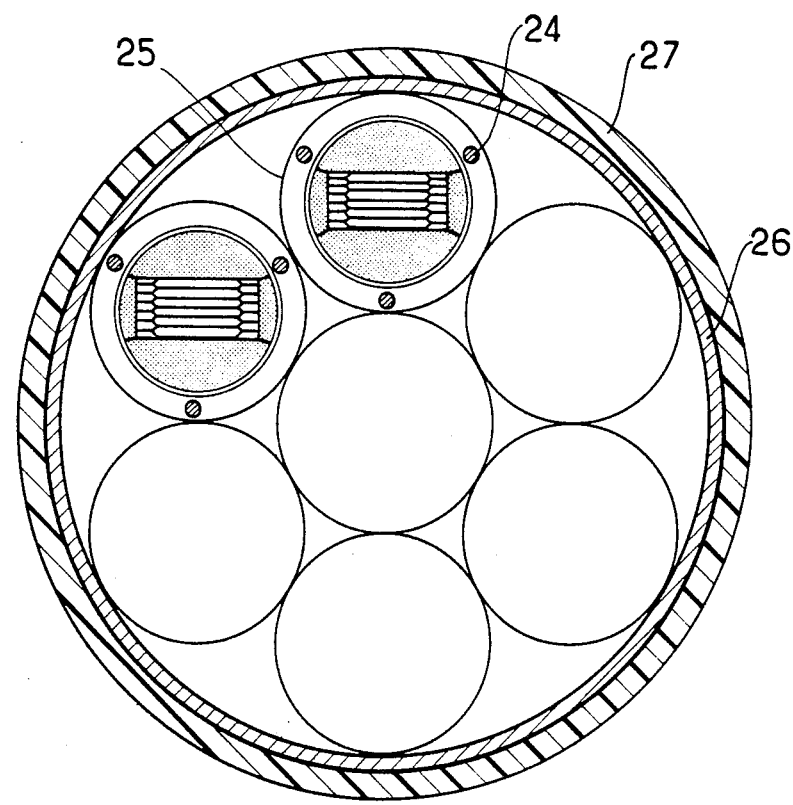
FIG. 10 is a cross-section of a cable containing seven strands.

FIG. 10 shows the structure of an optical telecommunications cable constituted by seven strands (25) and made on a conventional cable-making machine. A sheath of plastic or metallic material is applied to the strands assembled so as to impart to the cable the characteristics necessary for laying in a trench or for pulling through a duct. An advantageous solution resides in the manufacture of an aluminum tube (26) press drawn and swaged on the assembled strands, this aluminum sheath is then coated with a plastic material (27).

By way of a non-limiting example, the dimensional characteristics of such a cable can be:

| | |
|---|---|
| Basic matrix structure containing 36 optical conductors | 4.5 mm × 7 mm |
| Diameter of the elementary circular structure | 9 mm |
| Diameter of the basic strand | 11 mm |
| Diameter of the optical cable containing 7 strands, i.e. 252 optical conductors | 37 mm |

What is claimed is:

1. An optical telecommunications cable comprising: an outer tube of circular cross-section made of aluminum covered with a plastic material; a plurality of strands of circular cross-section inside said outer tube, the strands being assembled tangentially to one another; and each of the strands being constituted by an elementary circular structure covered by a tubular covering made of plastic material and reinforced by a plurality of strength members disposed in said covering, said elementary circular structure comprising a substantially rectangular matrix structure, surrounded with compressible cellular filler tapes made circular by being bound in a paper or plastic binding tape wound helically thereabout, said matrix structure being constituted by a plurality of tape components with ridges and troughs stacked and fastened to each other and including hexagonal cells containing respective optical conductors, each of the tape components being composed of two juxtaposed thin aluminum tapes with transversely spaced, longitudinally extending troughs, whose opposite surfaces are coated with polyethylene and welded longitudinally by heat softening of said polyethylene.

2. An optical cable according to claim 1, wherein said tape components are stacked with the ridges of one component in the troughs of the next component.

3. An optical cable according to claim 1, wherein said tape components are stacked ridge on ridge and at least one hexagonal void between two adjacent tape elements includes a strength member used for centering the tape components in relation to one another.

4. A method of manufacturing a matrix structure for an optical telecommunications cable, comprising pressing a series of transversely spaced longitudinal troughs of a trapezoidal cross-section in a ductile metal tape which is covered on one of its surfaces with a layer of thermoplastic and thermoweldable material, thereby forming ridges between said troughs, thermally welding two of said tapes to one another along said troughs so as to form a tape component in which facing pairs of said ridges constitute hexagonal tubes, inserting optical conductors into said tubes in the course of formation thereof and stacking a plurality of the fiber-containing tape components with the ridges of one component in the troughs of the adjacent components to form a matrix structure with a substantially rectangular cross-section.

5. A method of manufacturing a strand for an optical telecommunications cable from the matrix structure manufactured according to claim 4, wherein said ductile metal is aluminum and said thermoplastic and thermoweldable material is grafted polyethylene, said method further comprising adjoining a longitudinal filler tape of compressible cellular material on each long face of said matrix structure; winding a helical binding tape around said longitudinal filler tapes to compress them so that said tape-coated matrix structure becomes a structure of circular section constituting an elementary circular structure; twisting the elementary circular structure by winding it on a winder whose rotating drum besides rotating about its own axis also turns on an axis parallel to the axis of the elementary circular structure; and coating said elementary circular structure with a covering of plastic material reinforced by strength members so as to constitute a cable strand.

6. A method of manufacturing a matrix structure for an optical telecommunications cable, comprising pressing a series of transversely spaced longitudinal troughs of a trapezoidal cross-section in a ductile metal tape which is covered on one of its surfaces with a layer of thermoplastic and thermoweldable material, thereby forming ridges between said troughs, thermally welding two of said tapes to one another along said troughs so as to form a tape component in which facing pairs of said ridges constitute hexagonal tubes, inserting optical conductors into said tubes in the course of formation thereof and stacking a plurality of the fiber-containing tape components with the ridges of one component abutting against the ridges of the adjacent component to form hexagonal spaces between adjacent components, and affixing wires in said spaces to join said components together in guided reinforced manner.

7. A method of manufacturing a strand for an optical telecommunications cable from the matrix structure manufactured according to claim 6, wherein said ductile metal is aluminum and said thermoplastic and thermoweldable material is grafted polyethylene, said method further comprising adjoining a longitudinal filler tape of compressible cellular material on each long face of said matrix structure; winding a helical binding tape around said longitudinal filler tapes to compress them so that said tape-coated matrix structure becomes a structure of circular section constituting an elementary circular structure; twisting the elementary circular structure by winding it on a winder whose rotating drum besides rotating about its own axis also turns on an axis parallel to the axis of the elementary circular structure; and coating said elementary circular structure with a covering of plastic material reinforced by strength members so as to constitute a cable strand.

* * * * *